No. 848,261. PATENTED MAR. 26, 1907.
W. P. NORRINGTON.
SEAT FOR WAGONS.
APPLICATION FILED APR. 4, 1906.
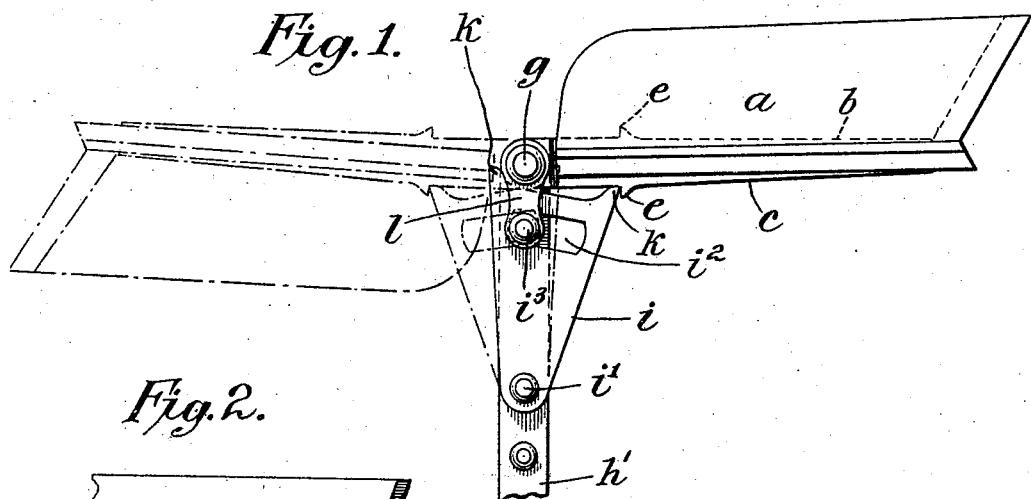
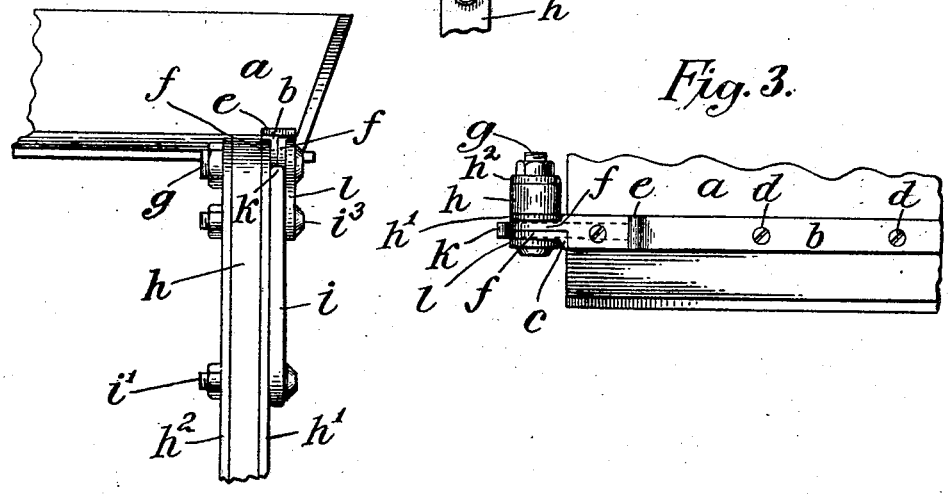
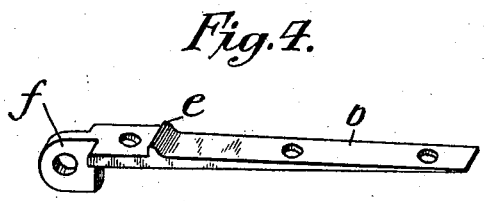
Attest:
Inventor:
William P. Norrington
by Redding, Kiddle & Greeley
Attys.

UNITED STATES PATENT OFFICE.

WILLIAM P. NORRINGTON, OF GREENPOINT, NEW YORK.

SEAT FOR WAGONS.

No. 848,261.        Specification of Letters Patent.        Patented March 26, 1907.

Application filed April 4, 1906. Serial No. 309,738.

*To all whom it may concern:*

Be it known that I, WILLIAM P. NORRINGTON, a citizen of the United States, residing in Greenpoint, Long Island, in the State of New York, have invented certain new and useful Improvements in Seats for Wagons, Trucks, &c., of which the following is a specification, reference being had to the accompanying drawings, forming a part hereof.

The driver's seat upon a commercial vehicle, such as a truck or wagon, is usually mounted upon the managers or head end of the wagon or truck body in such a manner as to permit it to be turned forward when it would otherwise prevent the placing of merchandise as close as permitted by the supporting-brackets to the head end or managers. In such a case the seat is usually allowed to rest upon the foot-board at a considerable inclination, so that it is practically impossible for the driver to sit upon the under side of the reversed seat, and, moreover, the usual saet-supporting brackets still prevent the loading of merchandise directly against the head end or managers at the level of the seat.

It is the object of this invention to provide a reversible seat which shall be firmly supported in a horizontal position, turned backward or forward, so that the driver can sit comfortably either upon the upper side of the seat when the same is in its normal position or upon the under side of the seat when it is turned forward, and for which the supporting devices shall be arranged so that there shall be no supports projected beyond the managers in either direction opposite to that in which the seat rests for the time being, thus permitting merchandise to be loaded directly against the managers when necessary, even at the level of the seat. Furthermore, the supports are so arranged that they adapt themselves automatically to the changed position of the seat, requiring no manipulation and no attention when the seat is turned from one position to the other. In accordance with the invention a brace or braces is or are mounted to swing upon the manager or managers or other vertical supports and are adapted to engage the under side of the seat when the seat is turned back in its normal position and to engage the upper side of the seat when it is turned forward or reversed. As the seat is turned from one position to the other it coacts with such brace or braces to shift it or them into the new position.

The invention will be more fully explained hereinafter with reference to the accompanying drawing, in which it is illustrated as embodied in a convenient and practical form, and in which—

Figure 1 is a view in side elevation, showing one of the managers or supporting-posts, the seat, and the corresponding brace, the reversed position of the parts being represented by dotted lines. Fig. 2 is a view in front elevation of the parts shown in Fig. 1. Fig. 3 is a top view of the parts shown in Fig. 1. Fig. 4 is a detailed view in perspective of one of the straps removed from the seat.

In the embodiment of the invention represented in the drawing, the seat $a$ is shown as of the usual form. It is provided on its upper side, near each end, with a strap $b$ and on its under side, in alinement with the strap $b$, a corresponding strap $c$, the two being conveniently secured by bolts $d$, which may pass through both straps. Each strap is provided with a lug $e$ for coöperation with the brace hereinafter mentioned and at its extremity, where it projects beyond the edge of the seat, with an eye $f$. The two straps $b$ and $c$ are preferably alike, so that when they are applied to the upper and lower sides of the seat-bottom, as shown, the two eyes $f$ shall be alined for the purpose of receiving a pivot-bolt $g$, which is mounted in the upper end of the corresponding manager or post $h$. Upon each post or manager $h$ is mounted so as to swing freely a triangular brace $i$, having at each of its upper angles a toe $k$ for coöperation with the corresponding lug $e$ of the strap $b$ or $c$, as the case may be. For convenience metal plates $h'$ and $h^2$ are secured to opposite sides of the post or manager $h$ for the purpose of receiving the bolt $g$, upon which the seat swings, and the bolt $i'$, upon which the brace $i$ swings. The brace is also preferably slotted, as at $i^2$, for the passage of a bolt $i^3$, which serves to limit the throw of the brace. A clevis $l$ may be applied to the bolts $g$ and $i^3$ outside of the swinging brace $i$.

It being understood that the brace $i$ is in the same fore-and-aft vertical plane as the straps $b$ and $c$, it will be seen that when the seat $a$ is in its normal position or turned back, as shown by full lines in Fig. 1, the strap or straps $c$ on the under side of the seat will bear upon the rear toe $k$ of the brace $i$, the lug $e$ coöperating therewith, whereby the seat is held in a horizontal position. When the seat is reversed or turned forward, the upper strap $b$ will coöperate with the forward toe $k$ of the brace $i$, causing the brace to be swung forward until the lug $e$ on the strap $b$ coacts with the forward toe $k$ to prevent the further movement of the seat and brace and to maintain the seat in its reverse horizontal position. The brace or braces $i$, as will be seen by reference to the dotted lines in Fig. 1, swing forward so that their rear edges stand substantially in the plane of the rear faces of the managers, leaving no brackets or other fixed parts projecting on the rear faces of the managers to prevent the loading of merchandise directly against the managers.

I claim as my invention—

1. The combination of a reversible wagon-seat, a support therefor, a brace mounted to swing on the support and coöperating with the under side of the seat in its normal position and with the upper side of the seat when reversed.

2. The combination of a reversible wagon-seat, a support therefor and a triangular brace mounted to swing on the support and having at its upper angles toes to coöperate respectively with the under side of the seat in its normal position and with the upper side of the seat when reversed.

3. The combination of a manager, a reversible seat mounted to swing thereon and a triangular brace mounted on the manager and having toes at its upper angles to coöperate respectively with the under side of the seat in its normal position and with the upper side of the seat when reversed.

4. The combination of a reversible wagon-seat, a support therefor, straps secured respectively to the upper and lower sides of said seat and having each a lug, and a triangular brace mounted to swing on the support and having toes at its upper angles to coöperate with said straps and lugs.

5. The combination of a reversible wagon-seat, straps secured respectively to the upper and lower sides thereof and having lugs and alined eyes at the edge of the seat, a manager having a supporting-bolt to enter said eyes, and a triangular brace mounted to swing on the manager and having toes at its upper angles to coöperate with the lugs on said straps.

This specification signed and witnessed this 31st day of March, A. D. 1906.

WILLIAM P. NORRINGTON.

In presence of—
    LUCELLE A. HALE,
    HERMAN SCHLIEMANN.